US012547748B2

(12) United States Patent
Wu et al.

(10) Patent No.: US 12,547,748 B2
(45) Date of Patent: Feb. 10, 2026

(54) DIGITAL DOCUMENT SEAL

(71) Applicant: Idemia Identity & Security France, Courbevoie (FR)

(72) Inventors: Teresa Wu, Pegram, TN (US); Rein-Lien Hsu, Edison, NJ (US); Brian Martin, Bedford, MA (US)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 307 days.

(21) Appl. No.: 18/325,723

(22) Filed: May 30, 2023

(65) Prior Publication Data

US 2024/0403457 A1 Dec. 5, 2024

(51) Int. Cl.
G06F 21/62 (2013.01)

(52) U.S. Cl.
CPC .............................. G06F 21/6209 (2013.01)

(58) Field of Classification Search
CPC .................................................. G06F 21/6209
See application file for complete search history.

(56) References Cited

U.S. PATENT DOCUMENTS

| | | | |
|---|---|---|---|
| 8,892,871 B2 | 11/2014 | Cho | |
| 10,403,076 B2 | 9/2019 | Chabanne et al. | |
| 11,431,704 B2 | 8/2022 | Mercier et al. | |
| 2004/0145661 A1* | 7/2004 | Murakami | H04N 1/32144 348/222.1 |
| 2005/0036651 A1* | 2/2005 | Wen | G06T 1/0028 382/100 |
| 2005/0066172 A1* | 3/2005 | Vorbruggen | G06T 1/0071 705/317 |
| 2005/0207614 A1* | 9/2005 | Schonberg | G06V 40/18 382/117 |
| 2017/0070638 A1* | 3/2017 | Min | H04N 1/00344 |
| 2019/0373137 A1 | 12/2019 | Krukar et al. | |
| 2020/0252210 A1* | 8/2020 | Sharfman | H04L 9/14 |

FOREIGN PATENT DOCUMENTS

| | | | |
|---|---|---|---|
| CN | 112819421 A | 5/2021 | |
| EP | 2048867 A1 * | 4/2009 | ......... H04N 1/32101 |
| EP | 3424179 B1 | 2/2022 | |
| JP | 4154209 B2 | 9/2008 | |
| JP | 2014219903 A | 11/2014 | |
| WO | 2017009154 A1 | 1/2017 | |

OTHER PUBLICATIONS

D. Shaked, A. Levy, Z. Baharav, and J. Yen, "A Visually Significant Two Dimensional Barcode," HPL-2000-164 (R.1), HP Laboratories Israel, Dec. 2001.
"Optical Machine Authentication—DocSeal—a graphical seal to protect against photo substitution and forgery," IDEMIA OMA Brochure, Jun. 2019. < https://www.idemia.com/wp-content/uploads/2021/02/optical-machine-authentication-demia-brochure-201906.pdf>.

* cited by examiner

*Primary Examiner* — Vance M Little
(74) *Attorney, Agent, or Firm* — Armstrong Teasdale LLP

(57) ABSTRACT

Systems and methods for sealing a document using a visible graphical digital seal are described, as well as systems and methods for authenticating a sealed document by identifying and decoding the digital seal.

18 Claims, 7 Drawing Sheets

DIGITAL DOCUMENT SEAL

TECHNICAL FIELD

The field of the disclosure relates generally to document authentication and, more particularly, to digital document seals for digitally authenticating documents.

BACKGROUND

The use of digital credentials continues to increase in diverse digital environments and applications, as has the need to verify or authenticate these digital credentials when they are used. Likewise, requirements for verification or authentication of various other digital documents and digital representations of physical documents have increased in number and complexity over time. The demand for authentication schemes with improved confidence and data freshness has risen in turn.

These digital documents are often protected by one or more of a password, a biometric factor, or an encryption scheme. However, while these protections can be effective in securing an authenticated document, they do not necessarily ensure the protected document is itself authentic or, in some cases, up to date.

It is desirable for an authentication scheme to have a strong level of confidence associated therewith, while also being flexible enough to maintain the secured document in an updated, or fresh, state. It is also desirable for such an authentication scheme to be applicable to any type of document, including physical documents, digital representations of physical documents (e.g., photos or scans of physical images as well as digital formats of a physical document), and digital-only documents.

SUMMARY

In one aspect, a document digital sealing and authenticating (DSA) computing device includes a processor communicatively coupled to a memory. The DSA computing device is configured to extract initial document data from a document to be sealed, receive initial authentication data associated with an owner of the document, and encode the initial document and authentication data. The DSA computing device is also configured to generate a digital seal based on the encoded data, the digital seal including a unique visible graphic, and apply the digital seal to the document to generate a sealed digital document including the document and the digital seal.

In another aspect, a method for sealing a document is implemented by a document digital sealing and authenticating (DSA) computing device including a processor communicatively coupled to a memory. The method includes extracting initial document data from a document to be sealed, receiving initial authentication data associated with an owner of the document, and encoding the initial document and authentication data. The method also includes generating a digital seal based on the encoded data, the digital seal including a unique visible graphic, and applying the digital seal to the document to generate a sealed digital document including the document and the digital seal.

In another aspect, a document digital sealing and authenticating (DSA) computing device includes a processor communicatively coupled to a memory. The DSA computing device is configured to receive an image of a sealed document, the image including a document having a digital seal thereon, the digital seal including a visible graphic. The DSA computing device is further configured to process the image to register and isolate the digital seal, decode data encoded in the digital seal, and authenticate the sealed document using the decoded data.

In a further aspect, a method of authenticating a sealed document is implemented using a document digital sealing and authenticating (DSA) computing device including a processor communicatively coupled to a memory. The method includes receiving an image of a sealed document, the image including a document having a digital seal thereon, the seal including a visible graphic. The method also includes processing the image to register and isolate the digital seal, decoding data encoded in the digital seal, and authenticating the sealed document using the decoded data.

DETAILED DESCRIPTION

The disclosed systems and methods provide for improved authentication of documents. As described further herein, the disclosure is directed to two phases of document authentication, including an initial verification or proofing phase, in which a seal is applied to the document, and a subsequent authentication phase, in which the document with the seal is presented, and the seal is analyzed to authenticate the document. The seal is a visible graphic and is associated with the document and the data therein. The seal functions as a link to an encryption of the document data as well as authentication data. Upon decryption of this information, the document associated with the seal can be authenticated.

Additionally, these systems and methods may be implemented without requiring specialized equipment (e.g., flatbed scanners), such as in applications where this equipment is unavailable. In such cases, the methods can be implemented using computing devices, such as mobile phones, with imaging and data transmission capabilities. In particular, some existing systems for authenticating documents require the use of a flatbed scanner to capture an image of a document presented for authentication. Although the use of the flatbed scanner may provide certain benefits, such as more standardized image quality and characteristics, it is recognized that there are many situations in which the scanner may be unavailable or that the use of a scanner is more time consuming or cumbersome than is desirable.

The present application is directed to authentication of documents in a more flexible scanning or image-capture environment. For example, the authentication systems and methods herein may be implemented using image-capture capabilities of a mobile computing device (e.g., a mobile phone) or a camera communicatively coupled to another computer device (e.g., a laptop or desktop computer), without requiring specialized imaging equipment. Notably, capturing images of a document to be authenticated using a mobile phone or other mobile imaging device may involve increased levels of "noise" compared to traditional scanner imaging, such as uneven lightings, focus blur, motion blur, and perspective distortion. Moreover, the document may not be completely captured in the image of the document may not have the known position in the image, as compared to documents scanned using a scanner with a known registration point. The systems and methods herein include advanced registration and pre-processing steps to overcome these issues, enabling accurate data extraction from the image of the document.

Figure 1:
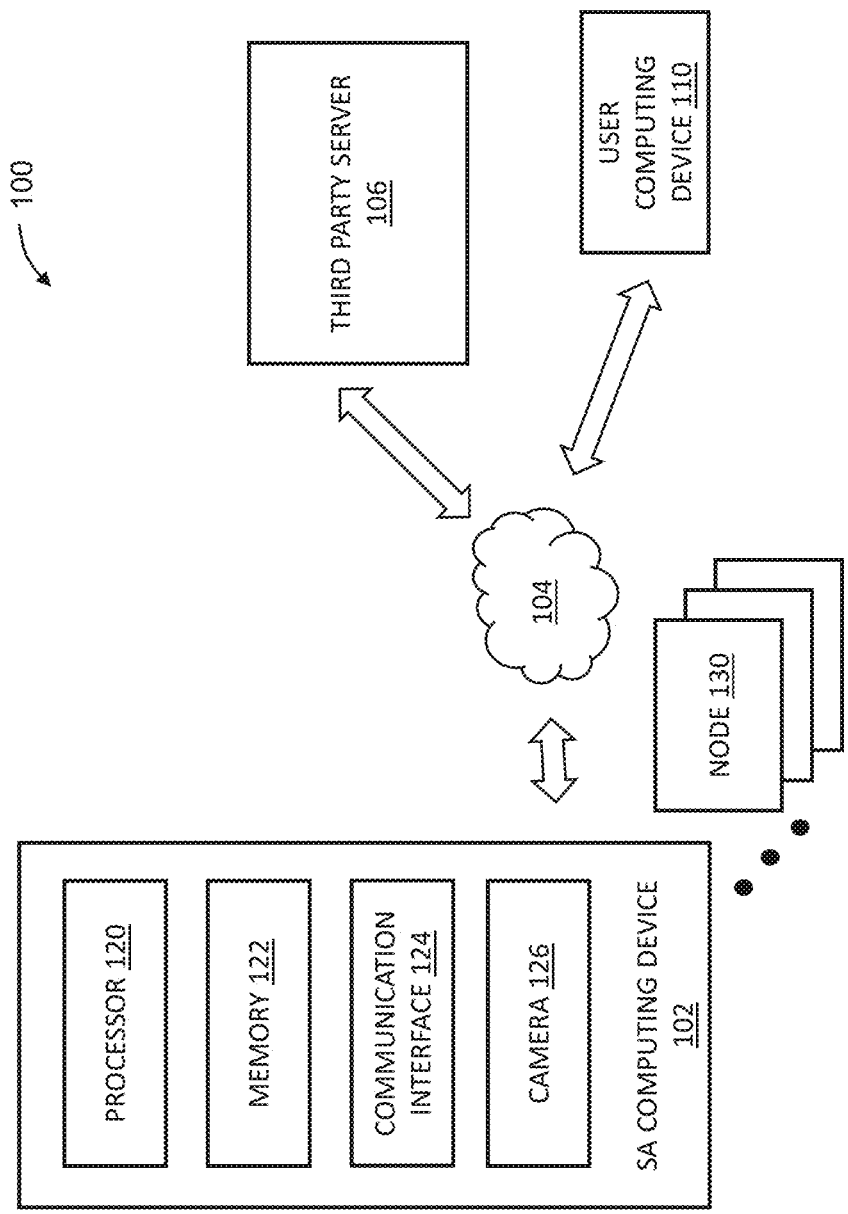
FIG. 1 is a schematic diagram of an example document authentication system in accordance with the present disclosure.
Figure 2:
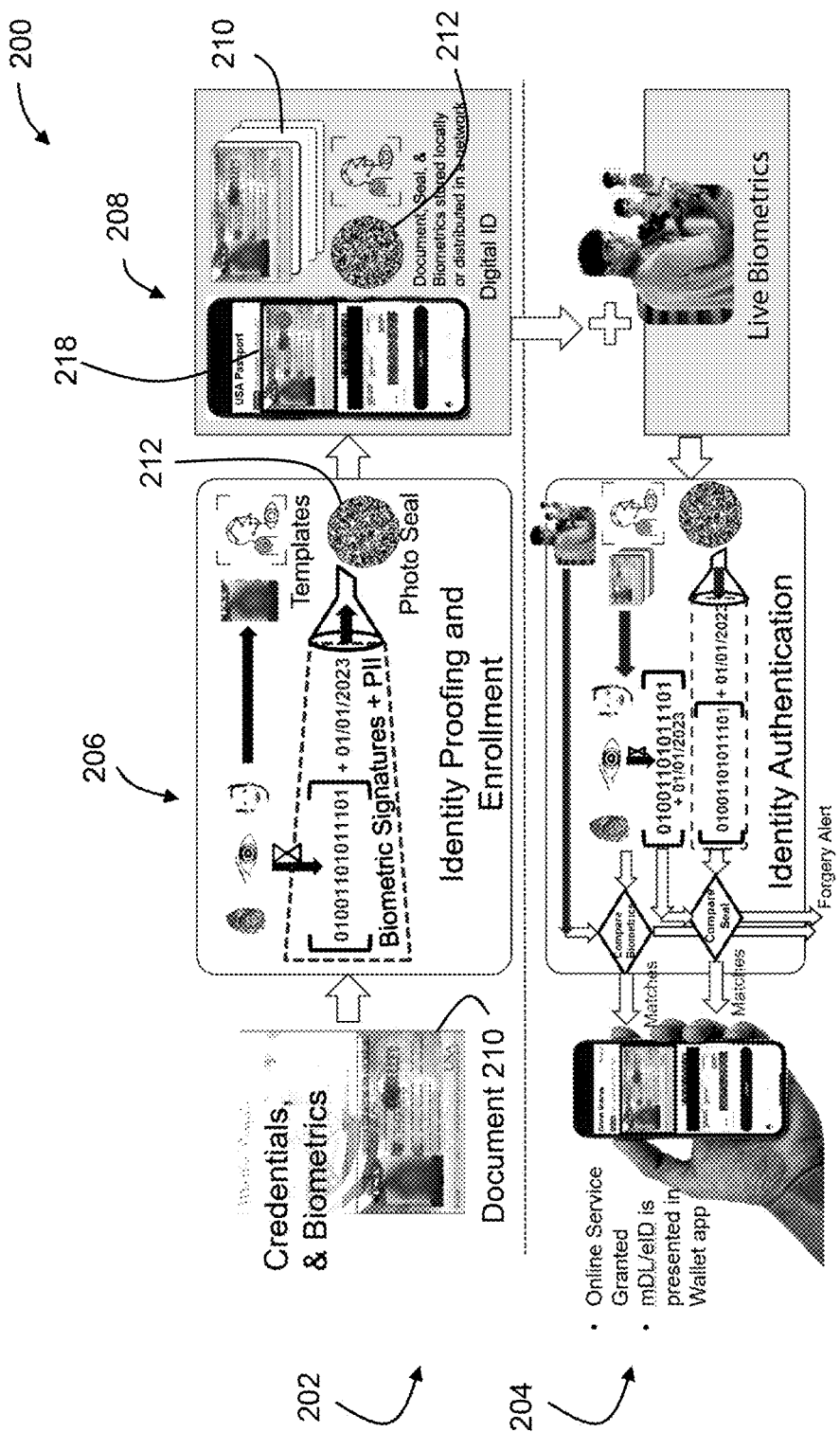
FIG. 2 is a flow diagram of a two-part document authentication procedure including a document proofing and sealing phase and a document authentication phase.

Turning now to the drawings, FIG. 1 is a schematic diagram of an example document authentication system 100 that may be used to implement the various functions described herein. FIG. 2 is a flow diagram of a two-part document authentication procedure 200 including a first phase 202, referred to as a proofing and sealing phase, and a second phase 204, referred to as an authentication phase.

The authentication system 100 includes a digital sealing and authenticating (DSA) computing device 102, also referred to as a DSA server, that performs the authentication procedure 200. The DSA computing device 102 includes a processor 120 and a memory 122. The processor 120 executes instructions stored on the memory 122 to implement one or more processes, or portions of processes, for document sealing and/or authentication. The DSA computing device 102 also includes a communication interface 124, for communicating with other devices (e.g., third-party servers 106, user computing devices 110, node computing devices 130, etc.) over a network 104. The communication interface 124 may be any wired and/or wireless communication interface that facilitates communication among computing devices over the network 104, which may include a wide-area-network, a local-area-network, the internet, and/or any other collection of networked computing devices. In some embodiments, the communication interface 124 may also facilitate wireless communications using any of a variety of wireless protocols, such as WiFi, BLUETOOTH, cellular, NFC, and/or other protocol(s) in the radio frequency (RF) spectrum. Although one DSA computing device is shown in FIG. 1, document authentication system 100 may include and employ more than one DSA computing device to perform the steps and processes discussed herein.

The data authentication system 100 also includes one or more third-party computing devices 106 (also referred to as third-party servers). The DSA computing device 102 is communicatively coupled to the third-party servers 106 via the network 104. The third-party servers 106 may include, for example, authorities responsible for issuing documents (e.g., credentials). The third-party servers 106 may also be associated with authentication requesting parties, or data sources of document data or authentication data. The DSA computing device 102 may also be communicatively coupled to one or more user computing devices 110. The user computing devices 110 are computers including a web browser or a software application enabling the user computing devices 110 to access the DSA computing device 102 via the network 104 using, for example, the Internet.

The DSA computing device 102, third-party servers 106, and/or user computing devices 110 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, or other web-based connectable equipment or mobile devices. In some embodiments, the third-party servers 106 and/or user computing devices 110 are capable of requesting and/or accessing information from or providing information to the DSA computing device 102 (e.g., providing documents, images of documents, document seals; requesting container files; etc.).

The data authentication system 100 also includes one or more node computing devices 130. The node computing devices 130 may be similar to the DSA computing device 102, third party servers 106, and/or client computing device 110. Broadly, the node devices 130 may be any computer device capable of maintaining a distributed electronic ledger (e.g., a blockchain).

With reference now to FIG. 2, the proofing and sealing phase 202 includes, broadly, the generation of a document 210 or the presentment of a generated document 210, the proofing (206) of the document 210, and the sealing (208) of the document 210 using the digital seal 212 of the present disclosure.

The document 210 in the example embodiment can be virtually any document that may need to be authenticated at a future time. In some instances, the document 210 is a credential document. In other instances, the document 210 is any other document, including documents containing sensitive information or information that may need to be authenticated in the future (such as, but not limited to, legal documents, financial documents, notarized documents, etc.). Additionally, the document 210 can be a physical document, a digital representation of a physical document (e.g., an image of a physical document captured using a camera, scanner, or other imaging device), or a digital-only document (e.g., an electronic document, such as a text or PDF document, a digital image, etc.). Therefore, the use of the term "document" herein should not be construed in a limiting manner in these respects.

In order to be proofed (206) and sealed (208), the document 210 is in its complete, or final, format. With respect to credential documents, the document 210 includes all credential information, which may include personally identifiable information (PII). With respect to other types of documents, the document 210 includes all information that will in some future time be authenticated. If the document 210 were incomplete or in a non-finalized version, the seal generated using the incomplete document would not be suitable or usable to eventually authenticate the final or complete document. Stated differently, the document 210 is in its finalized form, including all information to be authenticated, before it is proofed and sealed. Any modifications to document 210 after proofing (206) and sealing (208) are not assured by the seal and could be suspect.

The document 210 is proofed (206), or undergoes a preliminary authentication process 206 in which the document 210 is verified as real and/or complete. In the example embodiment, the DSA computing device 102 performs the document proofing (206). In some instances, with respect to a credential document, the document 210 and information therein is verified by the issuing authority (e.g., a third-party server 106) that issued the credential document. In other instances, with respect to other types of documents, a user may be prompted to declare or attest the information in the document 210 is complete and accurate as presented (e.g., via a user interface of their user computing device). In some cases, the proofing process (206) may be implemented locally, whereas in other cases, proofing (206) a document 210 may require communication with a third party (e.g., the issuing authority) via electronic communication (e.g., via an API call from the DSA computing device 102). Various methods for initially verifying (206) a document 210 may be implemented within the scope of the present disclosure.

Thereafter, the document 210 is sealed (208). Sealing (208) a document 210, in the context of the present application, refers to the provision of a visible seal 212 (otherwise referred to as a graphic, icon, or symbol) associated with the document 210, either digitally or physically, or both, as described further herein. In the example embodiment, the DSA computing device 102 performs the document sealing (208).

The document 210 includes information thereon, such as credential information, a document identifier (e.g., serial number or reference number), or otherwise. In some cases, the document 210 includes an expiration date. This information is referred to generally as document data, and represents the contents of the document 210 to be sealed and, subsequently, re-authenticated. Document data may include the actual content (e.g., images and/or texts) as well as characteristics thereof, such as placement, size/scale, formatting, and the like. For instance, document data may include an image as well as data indicating that the image is a particular size and located on a left-hand side of the document. The DSA computing device 102 extracts the document data using one or more appropriate data extraction techniques, including image processing techniques, optical character recognition (OCR), and the like.

The DSA computing device 102 also captures authentication data. Authentication data is associated with an owner (or other user) of the document 210 and may include, for example, biometric data, a password, a security question, etc. Biometric data may include, for example, a photograph (e.g., an image of a person's face on their credential document, or an image captured at the time of document sealing) for facial recognition, a fingerprint, a voice capture, a template of a person's iris for optical recognition, a signature, etc. The authentication data is captured for storage as an authentication sample, which can be accessed and analyzed during subsequent authentication procedures.

The DSA computing device 102 generates a seal 212 based on the document data and the authentication data. This document data and authentication data, compiled during the initial proofing and sealing phase (202), may be referred to herein as first, or initial, document data and first, or initial, authentication data, respectively. The DSA computing device 102 generates the seal 212 as a visible graphic containing random dots encoding the initial document data and authentication data (or a link thereto) therein.

In one exemplary embodiment, the seal 212 is a graphic that encapsulates or encodes the initial authentication data (e.g., biometric data) and the initial document data (e.g., PII, expiration date, or other data unique to the document). As such, in these embodiments, the seal 212 does not encode or represent the entirety of the document 210 being sealed, but only those elements of initial authentication and document data that are used for authenticating the document 210. Therefore, the image processing requirements during the authentication step (as described further herein) may be limited to the location of the seal 212, thereby reducing image processing requirements and the computing capacity delegated thereto.

Although reference is made through the present application to the seal 212 including or linking to both initial document data and initial authentication data, in some alternative embodiments, the DSA computing device 102 may generate the seal 212 based on only the document data.

The seal 212 encodes the document data for authentication, and a separate biometric authentication process may be implemented thereafter.

The graphic or symbol forming the seal 212 may have virtually any design, including a structured design similar to a QR code or bar code, or any arbitrary shape. In one example embodiment, the DSA computing device 102 retrieves a blank graphic, which has no encoded data but has the overall shape and design of the graphic. The DSA computing device 102 modulates and randomizes the dots (e.g., pixels or groups thereof) within the boundaries of the blank graphic to generate a unique seal 212 associated with the document. Other documents may be sealed using a same blank graphic, but the appearance of the resulting unique seal will be different, based on the unique arrangement of dots within the graphic boundaries, in which the initial document data and initial authentication data (or the link thereto) are encoded. The unique seal 212 is associated with only the document and functions as a link to the document data and authentication data, to access this data for authentication of the document 210. Therefore, the seal 212 is visually perceivable, but the data encoded therein, used for subsequent authentication of the document 210, is not.

Figure 3B:
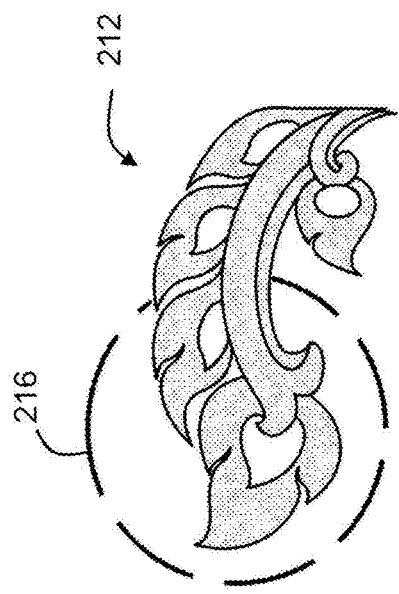
FIGS. 3A and 3B schematically depict document digital seals with additional patterns to enhance seal registration.
Figure 3A:
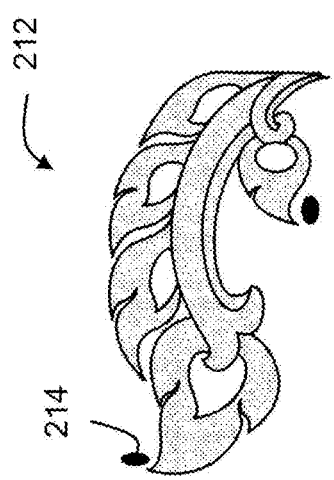

In some instances, the seal 212 includes extra patterns not related to the encoding of the data but rather as additional keypoints for subsequent registration and alignment of the seal 212, as shown in FIGS. 3A and 3B. For example additional ellipses 214 (FIG. 3A) or dashes 216 (FIG. 3B) may enhance keypoint matching and improve the accuracy and speed of image registration when the seal 212 is subsequently used for document authentication. Such patterns may therefore function as markers, but do not appear as traditional square/corner markers (as seen in traditional QR codes). Therefore, in at least some instances, the graphic is "markerless," such that the seal 212 includes no markers or placement squares.

In some embodiments, the DSA computing device 102 generates the seal 212 using the initial document data and authentication data as a signature for randomizing the dots of the seal graphic, such that the data can be later extracted from the seal 212 itself. In some such instances, because the initial document data and authentication data are encoded in the seal 212 itself, a relatively smaller region of interest of the document 210 (e.g., the seal 212 itself) needs to be captured for subsequent decoding.

In some embodiments, the DSA computing device 102 compiles and stores the initial document data and authentication data at a storage location in a local, remote, or distributed memory. The generated seal 212 encodes a link to the storage location. The DSA computing device 102 may also store a matching algorithm, or a link thereto, in the storage location. The matching algorithm enables matching of an authentication input or sample to the initial authentication data during authentication of the document 210.

In some embodiments, the DSA computing device 102 compiles and encrypts the initial document data and authentication data, and stores this encryption in a container file of an electronic ledger. In some cases, the DSA computing device 102 also stores a matching algorithm in the container file, or stores a link to the matching algorithm in the container file. The container file may also include a decryption key or a link thereto. The DSA computing device 102 generates a non-fungible token (NFT) for the document 210 based on the data stored in the container file. The generated seal 212 encodes a link to the container file and, therefore, to the NFT. The DSA computing device 102 stores the container file and NFT in a cloud-based electronic ledger (e.g., a blockchain) for secure, immutable storage. In some embodiments, the DSA computing device 102 may push or transmit container files and/or NFTs to other node devices 130 maintaining the electronic ledger. The DSA computing device 102 may additionally store the container files and/or NFTs on any other cloud-based storage device, such as one or more databases.

The DSA computing device 102 applies the generated seal 212 to the document 210. In one instance, where the document 210 is a physical document, the DSA computing device 102 applies the seal 212 physically by printing, etching, or otherwise marking the seal 212 directly on the physical document 210. In other instances, where the document 210 is digital, the DSA computing device 102 applies the seal 212 digitally by modifying the document 210 to include the seal 212 thereon. This modification may include generating an image layer including the seal 212 and applying the layer to the document 210. Therefore, when the document 210 is later presented for authentication, the document 210 includes the seal 212 upon presentment. In other words, the seal 212 is embedded in the same file as the document 210.

In other instances, the DSA computing device 102 applies the seal 212 by generating a separate file (e.g., a seal file) associated with the document 210 and stored locally at the user device (e.g., user computing device 110) used to present the document 210. When the document 210 is later presented for authentication, the seal file is also accessed, and accessing the seal file causes the seal 212 to be overlaid on the digital presentation of the document 210. Storing the seal file separately may improve the security of the sealed document, because both the seal file and the document file would be required to manipulate either file. The seal 212 and the document 210 associated with the seal 212 can be collectively referred to as a sealed document 218, regardless of whether the seal file is stored separately.

In one embodiment, the DSA computing device 102 generates the seal 212 as a static graphic with the initial document and authentication data encoded directly therein. The seal 212 cannot be changed, nor can any of the initial document or authentication data; otherwise, the seal 212 will not function to authenticate the document 210.

In another embodiment, the DSA computing device 102 generates the seal 212 as a static graphic linking to the storage location or container file, as described above. In some such embodiments, the initial data stored in the storage location or container file can be modified (e.g., a password can be changed), and the seal 212, encoding a link to the storage location or container file, may still be suitable for authenticating the document 210.

In one embodiment, where a document that has been sealed according to the present disclosure is updated or replaced upon expiration of the document, the owner of the document presents the updated or replacement document for initial proofing and sealing, as described above. The updated or replacement document is sealed with a new, unique seal 212. This requirement may enhance the security of the disclosed document authentication system, because no change in document data is permitted without re-proofing and sealing the document. Alternatively, such as where the seal file is separate from the document 210, the DSA computing device 102 may update the seal 212 and/or the initial data stored in the storage location or container file. For example, where a document 210 is renewed and some of the document data has changed, a user may employ the DSA computing device 102 to update the initial document data and update the seal 212, to enable future authentication of the document 210. This update procedure may be advantageously enabled where the document and authentication data are stored in the container file. Specifically, when new or updated information is received and/or incorporated into the container file, the DSA computing device 102 generates an updated NFT to represent the updated information. The updated NFT may be a completely new token, replacing any pre-existing token (while including a hash value of the previous token) or may be an updated version of the pre-existing token, with a hash including an update history of the container file and/or NFT. The NFT may therefore permit secured document authentication while enabling changes to the initial data (e.g., to maintain data freshness). The DSA computing device 102 may push any updates to container files and/or NFTs to node devices 130, in response to any updates as described herein.

Notably, the NFTs described herein may be formatted and stored as a unique data structure, which stores standardized, secured (e.g., encrypted) data associated with the document 210, in a readily retrievable format that enhances the efficiency, security, and reliability of document authentication systems 100. Additionally, in one example embodiment, the DSA computing device 102 securely stores container files that are accessible via cloud-based networks and devices, for improved accessibility to the associated NFTs.

Figure 4:
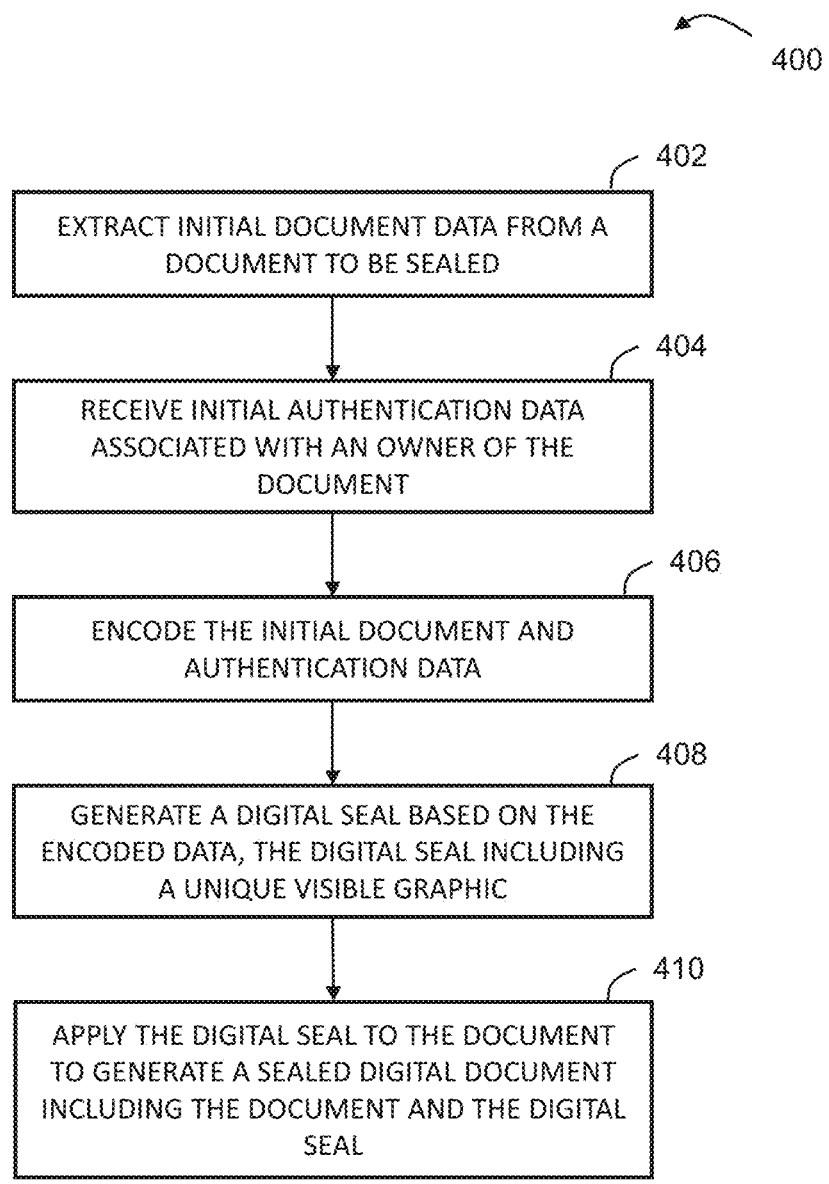
FIG. 4 is a flow diagram of a method of sealing a document.

FIG. 4 is a flow diagram of a method 400 of sealing a document using a digital seal. Method 400 may be implemented using the document authentication system 100 shown in FIG. 1, such as by the DSA computing device 102.

In one embodiment, method 400 includes extracting 402 initial document data from a document to be sealed and receiving 404 initial authentication data associated with an owner of the document. Method 400 also includes encoding 406 the initial document and authentication data and generating 408 a seal based on the encoded data, the seal including a unique visible graphic. Method 400 also includes applying 410 the seal to the document to generate a sealed document including the document and the seal.

Method 400 may also include additional, fewer, or alternative steps.

For example, in some embodiments, the document is a digital document, and applying 410 includes modifying a file containing the digital document to include the visible graphic. In some embodiments, applying 410 includes generating a seal file separate from a file containing the digital document, the seal file including the visible graphic, wherein, upon accessing the file containing the digital document to display the digital document, the seal file is also accessed and visually overlaid over the displayed digital document.

In some embodiments, the document is a physical document. Method 400 may further include receiving a file containing a digital representation of the document, and extracting initial document data from the document by applying one or more data extraction techniques to the file. In some cases, applying 410 includes modifying the file to include the visible graphic. In some cases, applying 410 includes generating a seal file separate from the file containing the digital representation of the document, the seal file including the visible graphic, wherein, upon accessing the file to display the digital representation of the document, the seal file is also accessed and visually overlaid over the displayed digital representation.

In some embodiments, encoding 406 includes encoding the initial document and authentication data by: (i) encrypting the initial document and authentication data; (ii) storing the encrypted data in a container file; and (iii) generating a non-fungible token (NFT) of the container file. Generating 408 may include generating the seal including an encoded link to the container file. In some embodiments, method 400 further includes encrypting a matching algorithm for matching an authentication data sample to the initial authentication data, and storing the encrypted matching algorithm in the container file. In some embodiment, method 400 includes encrypting a link to matching algorithm for matching an authentication data sample to the initial authentication data, and storing the encrypted link to the matching algorithm in the container file.

With reference again to FIG. 2, the DSA computing device 102 is also configured to implement the authentication phase 204 as well. In the identity authentication phase 204, the sealed document 218 is presented for authentication. In the context of the present application, authentication of the presented sealed document 218 refers to verification that the underlying document 210 has not been altered (fraudulently or otherwise) since generation of the seal 212, and that the presenter of the sealed document 218 is the legitimate user or owner of the sealed document 218.

The DSA computing device 102 is configured to receive an image of the presented sealed document 218, referred to herein as an unverified image. In one embodiment, the DSA computing device 102 includes an integrated image capture device, such as a camera 126 (as shown in FIG. 1), and captures the unverified image directly. In another embodiment, the DSA computing device 102 is communicatively coupled to a discrete image capture device, such as a camera, or to another computing device with a camera, and receives the unverified image therefrom.

Where the sealed document 218 is a physical document 210 with the seal 212 applied directly thereto, the unverified image may be a digital image of the sealed document 218 as physically presented to the DSA computing device 102 (or to a user thereof). Where the sealed document 218 is a sealed digital representation of the physical document 210, or is a sealed digital document 210, the sealed document 218 is displayed on the screen of a user computing device (e.g., user computing device 110), and the unverified image may be a photo of the screen. Alternatively, the unverified image may be captured using a scanner and transmitted to the DSA computing device 102.

In the example embodiment, the DSA computing device 102 is configured to determine whether the unverified image includes the entirety of the seal 212 and a suitable portion of the sealed document 218 to be authenticated (e.g., enough of the sealed document 218 that document data can be extracted for comparison to the initial document data). It is recognized that images captured using scanners typically have a known registration point (e.g., a corner of the scanner to which a scanned document is aligned) and typically include an entirety of a scanned document. Images captured using other image capture devices, such as mobile phone or tablet photos, may (a) not capture an entirety of the document, (b) capture the document in an unknown orientation, and/or (c) have additional noise, such as image blur or inconsistent brightness. Accordingly, the DSA computing device 102 is configured to perform one or more pre-processing steps on the received unverified image, to confirm the image is suitable for authentication of the pictured sealed document 218. Pre-processing may include, for example, preliminary key point registration to identify the seal 212 and its position relative to the overall unverified image, and/or confirmation that a field of view including an area about twice the area of the seal is captured in the unverified image. If an unverified image is not suitable, the DSA computing device 102 may return an error or may present a prompt to capture a new image (e.g., on an interface thereof, or as a message to a user computing device).

The DSA computing device 102 is configured to process the unverified image to authenticate (or not authenticate) the sealed document 218 pictured in the image. In the example embodiment, the DSA computing device 102 initiates one or more image processing steps, including seal localization, keypoint matching and registration, optical character recognition (OCR), and/or text extraction, to identify and decode the seal 212.

In particular, the DSA computing device 102 is programmed to initiate a keypoint matching and registration algorithm or sequence that enables the registration and alignment of the seal 212 even in unverified images captured using a mobile device. This algorithm is advantageously fast and efficient, to complement the use of mobile devices rather than traditional scanners, but also robust, such that no confidence in the resulting authentication is lost. The core registration algorithm implemented by the DSA computing device 102 includes a painting sequence, for flattening the high-entropy black-and-white data area of the unverified image to isolate the seal 212, and a keypoint finding and matching sequence, for aligning and registering the seal 212. This sequence enables seal localization, or a focused image processing sequence on substantially only the seal 212 (e.g., where the seal 212 does not encode the entire document but, for example, PII and biometric information only).

Figure 5:
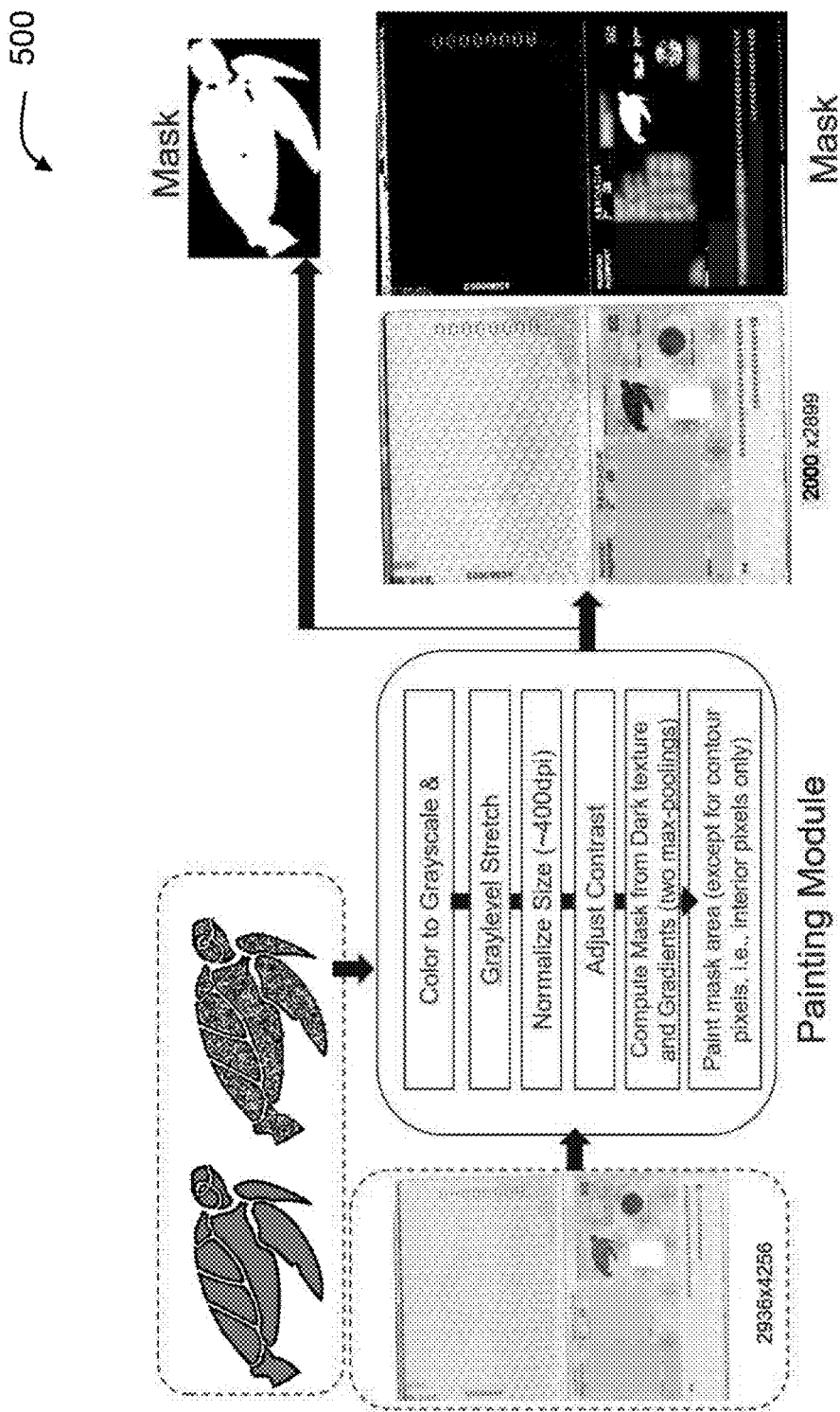
FIG. 5 is a flow diagram of a painting sequence for isolating the digital document seal.

In one embodiment, the DSA computing device 102 initiates the painting sequence 500, as schematically depicted in FIG. 5. The painting sequence 500 functions to remove the personalized dots within the unique seal 212 to prepare the seal 212 for keypoint matching. The area including and surrounding the unique seal 212 can include too many dots or potential points of interest, which can disrupt the subsequent keypoint matching. The painting sequence 500 includes converting the unverified image to grayscale, normalizing and adjusting the contrast of the grayscale image, and computing a mask corresponding to the seal 212. Once the seal 212 is masked, the grayscale image is painted, such that the non-masked area is a single color and the seal 212 is isolated.

Figure 6:
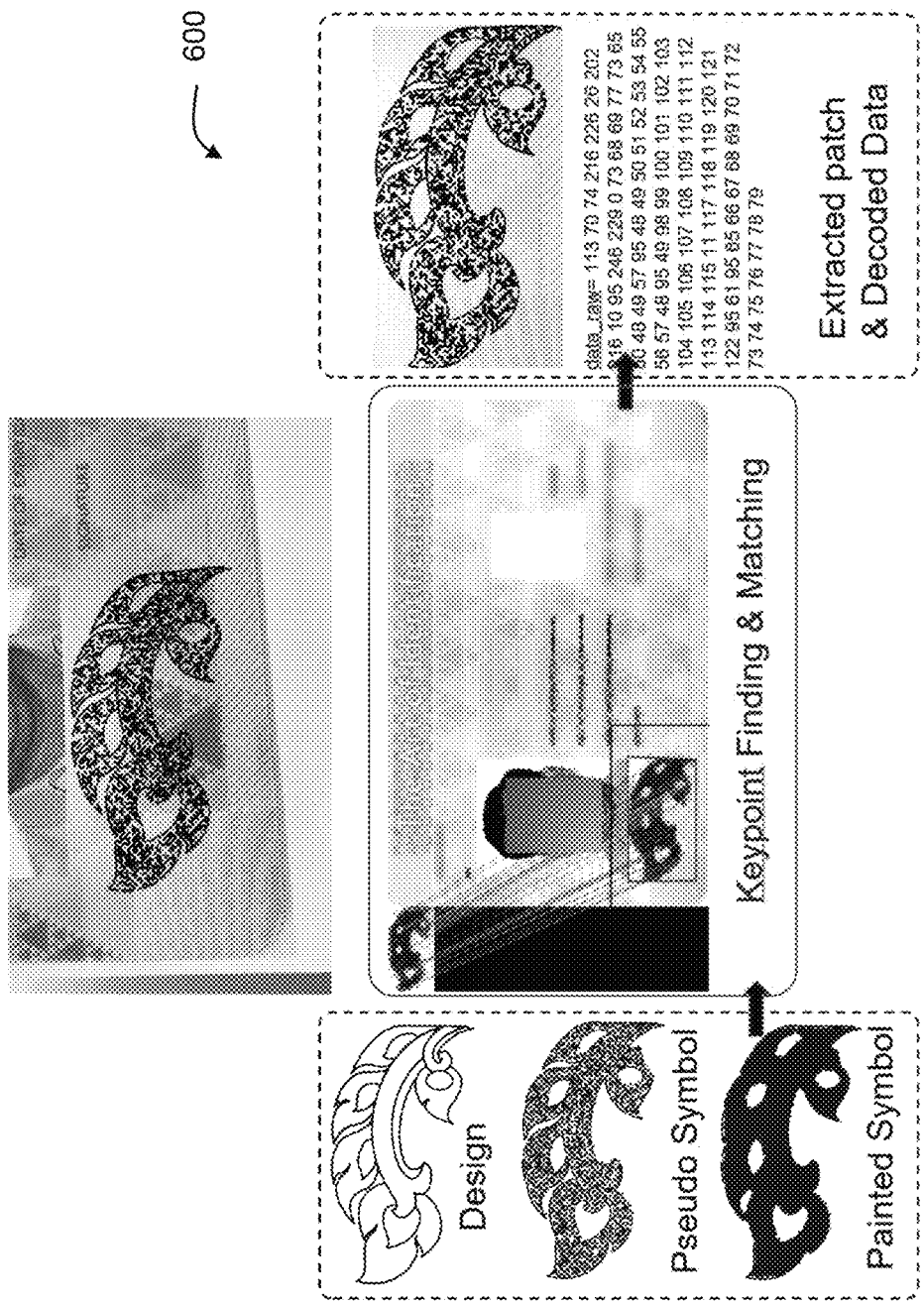
FIG. 6 is a flow diagram of a keypoint matching and registration sequence.

Thereafter, the DSA computing device 102 initiates the keypoint finding and matching sequence 600, as shown in FIG. 6, which enables aligning and registering the isolated seal 212, such that the information therein can be accurately decoded. In one embodiment, the isolated seal 212 is aligned and registered to its corresponding blank seal. The painting sequence 500 and/or the keypoint matching sequence 600 may be particularly suited for processing images/scans of physical documents or images/scans of digital documents that were presented on a screen or display of a computing device and scanned.

After successful registration of the unique seal 212, the information therein can be decoded. In some instances, if the registration is unsuccessful, the DSA computing device 102 returns a result indicating the associated sealed document 218 is not authenticated.

In one embodiment, the DSA computing device 102 decodes the seal 212, and accesses the initial document data and initial authentication data therein. In some instances, successful decoding of the seal 212 is sufficient to authenticate the presented sealed document 218. In some instances, the decoded initial document data and decoded initial authentication data undergo additional matching or comparison processes before the sealed document 218 can be authenticated, as described further herein.

In one embodiment, the DSA computing device 102 decodes the seal 212, and accesses the link encoded therein. The link points to a storage location or container file including the initial document and authentication data. Where the storage location is local or accessible using the network 104, the DSA computing device 102 retrieves the initial document and authentication data for subsequent processing. The retrieved data may also include one or more matching algorithms to be implemented by the DSA computing device 102, or a link thereto, such that the DSA computing device 102 is able to retrieve and access the matching algorithms. The DSA computing device 102 may cache the retrieved data in a local memory location, to improve processing efficiency.

Where the container file is located in a distributed electronic ledger, the DSA computing device 102 accesses the ledger (e.g., the blockchain) to retrieve the container file, which may include the NFT of the initial document and authentication data. The DSA computing device 102 decrypts the information in the container file (e.g., the NFT) to access and retrieve the initial document and authentication data. The retrieved data may also include one or more matching algorithms to be implemented by the DSA computing device 102, or a link thereto, such that the DSA computing device 102 is able to retrieve and access the matching algorithms. The DSA computing device 102 may cache the retrieved data in a local memory location, to improve processing efficiency.

The DSA computing device 102 is configured to extract current or real-time document data from the presented sealed document 218. As used herein, current and/or real-time refer to data as it is presented during the process of presentment, and therefore is current or real-time with respect to the authentication process. The DSA computing device 102 may perform one or more extraction processes (e.g., image processing, OCR, text extraction, etc.) on the unverified image to extract the current document data. Additionally or alternatively, the DSA computing device 102 may receive one or more secondary images of the presented sealed document 218, for the purposes of extraction of the current document data. In some cases, the DSA computing device 102 determines the unverified image does not include a sufficient field of view of the presented sealed document 218, and requests or prompts a user to capture the secondary image(s).

The DSA computing device 102 then compares the extracted current document data to the (decoded, retrieved, and/or decrypted) initial document data. If the two data sets match, the DSA computing device 102 authenticates the sealed document 218. In some cases, a "match" may require a perfect or exact match between any data element compared between the two document data sets. In other cases, a "match" may require matching of data elements above a certain threshold (e.g., 90%, 95%, 99%), to accommodate errors in data extraction or processing. If the two document data sets do not match, the DSA computing device 102 returns a result indicating the presented document is not authenticated. For example, the presented document includes current document data that has been altered since the document 210 was sealed, or that is different from the initial document data (e.g., in the case of a forged document). In some cases, where the initial document data included an expiration date, when the sealed document 218 is authenticated, the DSA computing device 102 will compare the (decoded) expiration date to a current date. If the expiration date has passed, in some cases, the DSA computing device 102 returns a result including a warning to the user that the document 210/sealed document 218 is expired. In some instances, the DSA computing device 102 may not authenticate an expired document. If the expiration date is within a certain threshold (e.g., the current date is less than one month before the expiration date), the DSA computing device 102 may authenticate the sealed document 218 and may also return a result including a warning or alert to the owner of the sealed document 218 that the expiration date is approaching.

In the example embodiment, the DSA computing device 102 is also configured to implement a matching algorithm to match current or real-time authentication data with the (decoded, retrieved, and/or decrypted) initial authentication data. The DSA computing device 102 receives current or real-time authentication data, such as a user-provided password, answer to a security question, or biometric sample. The DSA computing device 102 retrieves the matching algorithm, for example, from a local memory cache or from a storage location identified by a link (e.g., in the container file). The DSA computing device 102 executes the matching algorithm with the current or real-time authentication data and the initial authentication data as inputs. Based on the output from the matching algorithm, if the two data sets match, the DSA computing device 102 authenticates the document. In some cases, a "match" may require a perfect or exact match between any data element compared between the two authentication data sets. In other cases, a "match" may require matching of data elements above a certain threshold (e.g., 90%, 95%, 99%), to accommodate errors in data extraction or processing. If the two authentication data sets do not match, the DSA computing device 102 returns a result indicating the document is not authenticated.

In some embodiments, the DSA computing device 102 is configured to authenticate a presented sealed document 218 only if: (a) the seal 212 is successfully registered, (b) the document data sets match, and (c) the authentication data sets match. In other embodiments, the DSA computing device 102 may authenticate the presented sealed document 218 with fewer, additional, or alternative conditions.

Figure 7:
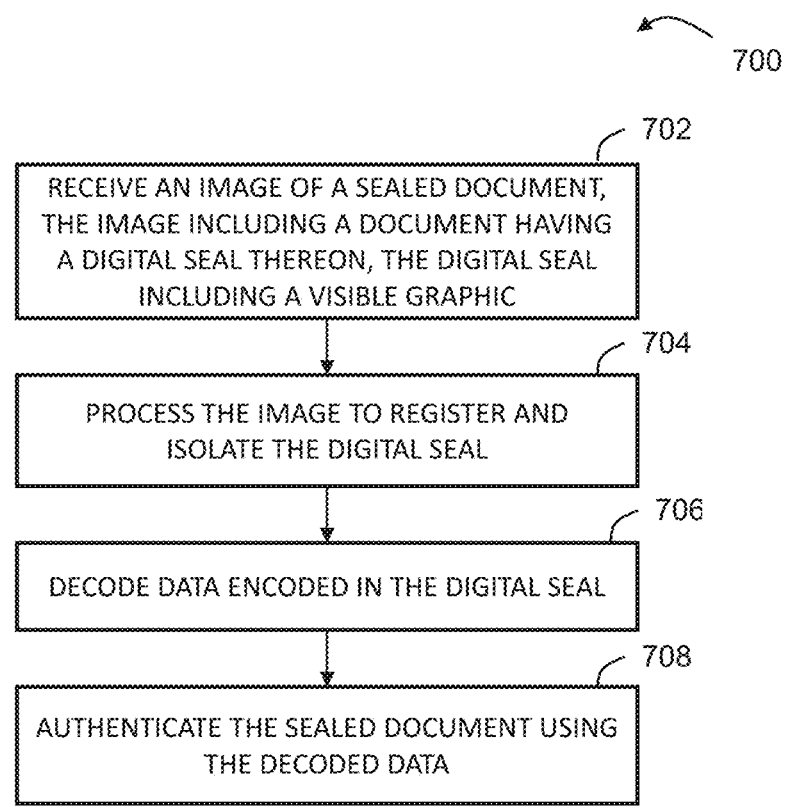
FIG. 7 is a flow diagram of a method of authenticating a sealed digital document.

FIG. 7 depicts a flow diagram of a method 700 of authenticating a seal document. Method 700 may be implemented by the document authentication system 100, shown in FIG. 1, such as by the DSA computing device 102.

Method 700 includes receiving 702 an image of a sealed document, the image including a document having a seal thereon, the seal including a visible graphic. Method 700 also includes processing 704 the image to register and isolate the seal, decoding 706 data encoded in the seal, and authenticating 708 the sealed document using the decoded data.

Method 700 may include additional, fewer, or alternative steps. For example, in some embodiments, where the data encoded in the seal includes a link to a storage location, decoding 706 may include accessing initial document data and initial authentication data from the storage location. In some embodiments, authenticating 708 includes extracting current document data from the image, matching the current document data to the initial document data, receiving current authentication data from an owner of the sealed document, and matching the current authentication data to the initial authentication data. Matching the current authentication data to the initial authentication data may include accessing a matching algorithm, and applying the current authentication data to the initial authentication data as inputs to the matching algorithm.

In some embodiments, where the data encoded in the seal includes a link to a container file stored on a blockchain, decoding 706 may include accessing the container file, and decrypting an NFT associated with the container file to access initial document data and initial authentication data from the container file. In some embodiments, authenticating 708 includes extracting current document data from the image, matching the current document data to the initial document data, receiving current authentication data from an owner of the sealed document, and matching the current authentication data to the initial authentication data. Matching the current authentication data to the initial authentication data may include accessing a matching algorithm, and applying the current authentication data to the initial authentication data as inputs to the matching algorithm.

It should be recognized that although the various processes described herein are indicated as being performed by one DSA computing device 102, in other embodiments, multiple computing devices (e.g., multiple DSA computing devices) may be used in combination to perform one or more steps or processes. For example, one DSA computing device 102 may perform proofing and sealing of a document, and a different DSA computing device 102 may perform authentication of a presented sealed document.

Embodiments of the systems and methods described herein thus facilitate digitally sealing a document and authenticating/validating a sealed document when presented. These methods may be implemented in, for example, an automatic security system for analyzing digitized or "scanned" physical documents (including identification or credential documents) and/or digitally created documents, using the document seal described herein. The seal may be implemented as a visual graphic, icon, symbol, or the like, which may encode personal data and/or biometric data, such as a facial portrait, date of birth, etc. The seal can be overlaid onto the document in a same file, or can be stored separately (e.g., in a central networked storage location or a distributed blockchain).

The systems and methods herein facilitate such document sealing and authentication using mobile devices (e.g., mobile phones, tablets, etc.), and as such includes particular registration algorithms to enable robust and efficient location and isolation of the seal using mobile image capture devices. These algorithms include removal of the personalized random-dots of the unique seal by a symbol painting sequences, to enable effectively matching keypoints between a null-person or blank graphic/symbol and a personalized graphic/symbol. Advantageously, the graphic/symbol can then be registered using a comparatively small field of view around the graphic/symbol. In some embodiments, the seal includes additional patterns around the symbol to enhance the registration process. The content encoded in the seal can then be readily decoded, to authenticate the presented document. During the authentication phase, the system described herein not only compared the presented document and current/real-time biometrics against the content of the sealed document, but also validates the seal itself. Therefore, these systems and methods enable the generation of a digital seal as an additional security later to protect the freshness of personal identifiable information (PII), or other document data, and biometric data included in a digital document.

The systems and methods described herein may be implemented using computer programming or engineering techniques including computer software, firmware, hardware or any combination or subset thereof, wherein the technical effects and specific improvements to the technology and technical field may include one or more of: (i) improved accuracy of document authentication; (ii) authentication processing that is device-agnostic and applicable across device variations; (iii) authentication processing using mobile devices, without requiring specialized devices or scanners, (iv) storing proofed or verified document and authentication data in an encrypted electronic ledger, such as a blockchain; (v) generating NFTs as unique data structures that can be encrypted and subsequently decrypted for access to the document and authentication data to authenticate a presented sealed document; (vi) ensuring the integrity of data encoded in the seal; and (vii) enhancing mobile and digital document authentication while maintaining image registration and data matching efficiency.

As used herein, the term "user credential" or "credential" may include any physical or digital form of credential document, identification, or other documentation associated with a user that may be used to identify the user. For example, in at least some embodiments, user credentials may include any form of photo identification (photo ID), such as a driver's license, passport, or other government or non-government issued photo ID. In some embodiments, user credentials may include permissions and privileges (e.g., not just identity attributes such as a "driving privilege" or "right to hunt/fish in a specific location"). For example, data shared from a user credential may be data received from one or more issuing authorities. As an example, data stored in the user credential may be received from a Department of Motor Vehicles (DMV) and a local hospital (e.g., examples of data stored in the user credential include DMV portrait, DMV first name, DMV last name, DMV document number, Hospital driver license number, Hospital first name, Hospital last name, Hospital covid-19 vaccine name, Hospital covid-19 vaccination date). Likewise, in some embodiments, user credentials may include transaction instruments, such as payment cards (e.g., credit and debit cards). In some embodiments, a user credential may include a plurality of user credentials.

As used herein, an NFT (non-fungible token) is a digital asset that represents another object, such as, but not limited to, a physical or digital document. The NFT may be generally stored in a blockchain or other cryptographic ledger or register. The ownership of the NFT (an owner of a document, in the case of the present application) may be stored on the corresponding blockchain, ledger, and/or register.

A blockchain is a distributed database, or "ledger," that maintains a continuously-growing list of ordered records, known as blocks. Each block may contain at least a timestamp and a link to the previous block in the chain. The link to the previous block may be a hash of the previous block. To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor.

Other electronic ledger infrastructure may be employed, which may include blockchains or other similar technology. More broadly, the term "container file," as used herein, may refer to a block in a blockchain, or to any other recorded instance in an immutable electronic ledger. In at least one embodiment, the NFT entry on the blockchain includes the location of the NFT and a hash of the NFT. This hash allows the DSA computing device and/or any users to ensure the NFT has not been modified.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is generally not intended to imply certain embodiments require at least one of X, at least one of Y, and at least one of Z to each be present. Additionally, conjunctive language such as the phrase "at least one of X, Y, and Z," unless specifically stated otherwise, should be understood to mean any combination of at least one of X, at least one of Y, and at least one of Z.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A document digital sealing and authenticating (DSA) computing device comprising a processor communicatively coupled to a memory, the DSA computing device configured to:
   extract initial document data from a document to be sealed;

receive initial authentication data associated with an owner of the document;

encode the initial document data and authentication data by:

encrypting the initial document data and authentication data;

storing the encrypted data in a container file; and generating a non-fungible token (NFT) of the container file;

generate a digital seal based on encoded data, wherein the digital seal includes an encoded link to the container file, the digital seal including a unique visible graphic; and apply the digital seal to the document to generate a sealed digital document including the document and the digital seal.

2. The DSA computing device of claim 1, wherein the document to be sealed is a digital document, and wherein the DSA computing device is further configured to apply the digital seal to the digital document by modifying a file containing the digital document to include the visible graphic.

3. The DSA computing device of claim 1, wherein the document to be sealed is a digital document, and wherein the DSA computing device is further configured to apply the digital seal to the document by generating a seal file separate from a file containing the digital document, the seal file including the visible graphic, wherein, upon access of the file containing the digital document to display the digital document, the seal file is also accessed and the digital seal is visually overlaid over the displayed digital document.

4. The DSA computing device of claim 1, wherein the document is a physical document, and wherein the DSA computing device is further configured to:

receive a file containing a digital representation of the document;

extract initial document data including an expiration date from the document by applying one or more data extraction techniques to the file.

5. The DSA computing device of claim 4, wherein the DSA computing device is further configured to apply the digital seal to the document by modifying the file to include the visible graphic.

6. The DSA computing device of claim 4, wherein the DSA computing device is further configured to apply the digital seal to the document by generating a seal file separate from the file containing the digital representation of the document, the seal file including the visible graphic, wherein, upon access of the file to display the digital representation of the document, the seal file is also accessed and the digital seal is visually overlaid over the displayed digital representation.

7. The DSA computing device of claim 1, wherein the DSA computing device is further configured to:

encrypt a matching algorithm for matching an authentication data sample to the initial authentication data; and store the encrypted matching algorithm in the container file.

8. The DSA computing device of claim 1, wherein the DSA computing device is further configured to:

encrypt a link to a matching algorithm for matching an authentication data sample to the initial authentication data; and store the encrypted link to the matching algorithm in the container file.

9. The DSA computing device of claim 1, wherein the initial document data includes one or more of personally identifiable information, a document identifier, or an expiration date.

10. The DSA computing device of claim 1, wherein the initial authentication data includes one or more of biometric data, a password, and a security question.

11. A document digital sealing and authenticating (DSA) computing device comprising a processor communicatively coupled to a memory, the DSA computing device configured to:

receive an image of a sealed document, the image including a document having a digital seal thereon, the digital seal including a visible graphic, wherein data encoded in the digital seal includes a link to a container file stored on a blockchain;

process the image to register and isolate the digital seal;

decode data encoded in the digital seal by accessing the container file by decrypting an NFT associated with the container file to access initial document data and initial authentication data from the container file; and authenticate the sealed document using the decoded data.

12. The DSA computing device of claim 11, wherein the sealed document includes a digital file including a digital representation of a physical document overlaid with the digital seal.

13. The DSA computing device of claim 11, wherein the sealed document includes a first digital file including a digital representation of a physical document and a second digital file including a digital overlay of the digital seal.

14. The DSA computing device of claim 11, wherein the data encoded in the digital seal includes a link to a storage location, wherein the DSA computing device is further configured to decode the data encoded in the digital seal by accessing initial document data and initial authentication data from the storage location.

15. The DSA computing device of claim 14, wherein the DSA computing device is further configured to authenticate the sealed document by:

extracting current document data from the image;

matching the current document data to the initial document data;

receiving current authentication data from an owner of the sealed document; and matching the current authentication data to the initial authentication data.

16. The DSA computing device of claim 15, wherein the DSA computing device is further configured to match the current authentication data to the initial authentication data by:

accessing a matching algorithm; and applying the current authentication data to the initial authentication data as inputs to the matching algorithm.

17. The DSA computing device of claim 12, wherein the DSA computing device is further configured to authenticate the sealed document by:

extracting current document data from the image;

matching the current document data to the initial document data;

receiving current authentication data from an owner of the sealed document; and matching the current authentication data to the initial authentication data.

18. The DSA computing device of claim 17, wherein the DSA computing device is further configured to match the current authentication data to the initial authentication data by:

accessing a matching algorithm; and
applying the current authentication data to the initial authentication data as inputs to the matching algorithm.

\* \* \* \* \*